United States Patent [19]

Antonini et al.

[11] Patent Number: 4,844,485
[45] Date of Patent: Jul. 4, 1989

[54] LIP SEAL ASSEMBLY FOR A ROTATABLE SHAFT

[75] Inventors: Joseph Antonini, Chicago; Edward L. Walinski, Elgin, both of Ill.

[73] Assignee: Dana Corporation, Toledo, Ohio

[21] Appl. No.: 264,148

[22] Filed: Oct. 28, 1988

[51] Int. Cl.[4] .......................... F16J 15/32; F16J 15/54
[52] U.S. Cl. ...................................... 277/153; 277/26; 277/237 R
[58] Field of Search ........................ 277/1, 22, 26, 134, 277/152, 153, 237

[56] References Cited

U.S. PATENT DOCUMENTS

| | | |
|---|---|---|
| 1,969,797 | 8/1934 | Hubbard et al. . |
| 2,253,904 | 8/1941 | Haug . |
| 2,750,212 | 8/1956 | Skinner . |
| 2,804,324 | 8/1957 | Stallings . |
| 2,804,325 | 8/1957 | Reising . |
| 2,882,074 | 4/1959 | Charhut . |
| 3,062,555 | 11/1962 | Britton . |
| 3,099,454 | 7/1963 | Walinski . |
| 3,269,736 | 8/1966 | Hieber et al. . |
| 3,275,331 | 9/1966 | Mastrobattista et al. ....... 277/152 X |
| 3,306,620 | 2/1967 | Taschenberg . |
| 3,350,105 | 10/1967 | Browning et al. . |
| 3,387,850 | 6/1968 | Mastrobattista et al. . |
| 3,443,817 | 5/1969 | Reiling . |
| 3,489,420 | 1/1970 | Woodling . |
| 3,549,445 | 12/1970 | McMahon ...................... 277/152 X |
| 3,561,770 | 2/1971 | Corsi et al. . |
| 3,572,732 | 3/1971 | Sekulich . |
| 3,938,813 | 2/1976 | Forch . |
| 4,131,285 | 12/1978 | Denton et al. . |
| 4,190,258 | 2/1980 | Arai et al. . |
| 4,283,064 | 8/1981 | Staab et al. . |
| 4,383,691 | 5/1983 | Potter . |
| 4,526,383 | 7/1985 | Fuchs et al. . |
| 4,589,665 | 5/1986 | Arai et al. ........................ 277/153 X |

FOREIGN PATENT DOCUMENTS

| | | | |
|---|---|---|---|
| 1902491 | 11/1970 | Fed. Rep. of Germany ........ 277/26 |
| 60-192167 | 9/1985 | Japan ..................................... 277/152 |
| 590139 | 7/1947 | United Kingdom .................. 277/26 |

Primary Examiner—Robert S. Ward
Attorney, Agent, or Firm—MacMillan, Sobanski & Todd

[57] ABSTRACT

An annular seal assembly for sealing an enclosed rotatable shaft. An annular sealing element is frictionally retained between portions of inner and outer metallic cases. The sealing element includes a sealing annulus and a reinforcing annulus which are disposed in laminar fashion and retained between the outer and inner cases. The sealing annulus is deflected by and sealingly engages the outer surface of the shaft when inserted therein. The reinforcing annulus is formed of silicone and is disposed adjacent to the sealing annulus so as to urge the sealing annulus into sealing engagement with the enclosed shaft, particularly when the sealing annulus is cold or when the shaft is highly eccentric. The reinforcing annulus is responsive to an increase in temperature or to an absorption of liquid for increasing in size, thereby reducing the amount of compressive force exerted thereby against the deflected portion of the sealing annulus.

10 Claims, 3 Drawing Sheets

LIP SEAL ASSEMBLY FOR A ROTATABLE SHAFT

BACKGROUND OF THE INVENTION

The present invention relates in general to sealing structures and in particular to an annular seal assembly adapted to be disposed about a rotatable shaft.

Many different types of seal assemblies are known in the art for providing a seal about the outer peripheral surface of a rotatable shaft. Such seal assemblies generally include an annular metallic case which supports a resilient sealing element therein. The sealing element can be formed from one or more flat annular laminae of material. A central aperture is formed through the sealing element so as to define an inner diameter which is smaller than the outer diameter of the shaft. As a result, the sealing element is deflected by the outer peripheral surface of the shaft when inserted thereabout. This deflection of the resilient sealing element causes it to exert a compressive force against the outer peripheral surface of the shaft, thereby providing a sealing engagement therewith.

The sealing element of the seal assembly must exert a sufficient sealing pressure radially inwardly against the outer peripheral surface of the shaft in order to provide a good sealing contact therewith under varying conditions of temperature, dampness, and the like. At the same time, it is important that the sealing element be formed from a relatively non-abrasive material so as not to score or otherwise damage the enclosed shaft. To be economical, the sealing element should also be resistant to wear, heat, pressure, and corrosion, as well as being simple and inexpensive in construction. By varying the materials used to form the sealing element and the sizes thereof, the performance of the seal assembly can be adjusted to suit a particular application therefor, as well as to account for cost of the product.

Fluorocarbon resins are one type of material known in the art which meet many of the foregoing requirements for the sealing element material. Polytetrafluoroethylene, better known under the commercial designation "Teflon", is a well known brand of fluorocarbon resin which is widely used as one (and sometimes the only) lamina of material in the sealing element of a rotatable shaft seal assembly. Teflon is durable, but relatively non-abrasive, making it a preferred choice for sealingly engaging the outer peripheral surface of a rotating shaft.

While Teflon performs satisfactorily in many situations, there are certain instances where a sealing element formed solely of this material will not function adequately. One such instance is when the Teflon material is relatively cold, such as occurs during the start of operation of the device within which the seal assembly is used. The relatively cold temperature of the Teflon material reduces its inherent tendency to return to its undeflected shape, thereby causing it to exert a lesser force against the outer surface of the shaft than it does when it is warmer. Another such instance is when the shaft to be sealed exhibits a relatively large amount of eccentricity when rotated at a relatively high speed relative to the seal assembly. In these instances, it has been found that the Teflon material will not follow the eccentric surface of the rotating shaft quickly enough to prevent leakage.

In an attempt to remedy these drawbacks, it has been proposed that inner diameter of the annular Teflon material simply be formed much smaller than the outer diameter of the enclosed shaft. Although such a seal assembly does exhibit improved performance characteristics, the Teflon material tends to exert too much pressure on the enclosed shaft after it has warmed up causing undue friction and premature wear. A similar situation occurs when the deflected portion of the Teflon material is further compressed against the shaft by a spring or an elastomeric material disposed thereabout. These additional compressive means are not as responsive to temperature or other conditions as is Teflon. Thus, if the combination of the sealing forces generated by the compressive means and the Teflon material exerts a sufficient force against the enclosed shaft to prevent leakage in a cold start situation, then such combined forces are excessive after the Teflon material has been warmed and, as mentioned above, exerts a greater individual sealing force.

It has also been proposed that the Teflon material be replaced with synthetic rubbers and other resilient elastomeric materials which are not affected by cold temperatures and highly eccentric shafts to the same extent as Teflon. Such materials perform well in these situations. However, resilient elastomers are not as durable as Teflon, and they often succumb to the effects of wear, heat, pressure, and corrosion. Thus, such resilient elastomers generally wear out must faster than Teflon. Other more durable materials, such as silicone, have been found to be too abrasive, causing scoring of the shaft to be sealed. Accordingly, it would be desirable to provide an improved sealing element for a rotatable shaft seal assembly which is durable, yet performs satisfactorily when subjected to relatively cold temperatures and highly eccentric shaft situations.

SUMMARY OF THE INVENTION

The present invention relates to an improved annular seal assembly for sealing an enclosed rotatable shaft. The seal assembly includes outer and inner annular metallic cases, each having a generally L-shaped cross section. An annular sealing element is frictionally retained between portions of the inner and outer cases. The sealing element includes a sealing annulus and a reinforcing annulus which are disposed in laminar fashion and are retained between the outer and inner cases. The sealing annulus is formed from a durable, relatively non-abrasive material, such as Teflon. The sealing annulus is deflected by and sealingly engages the outer surface of the shaft when inserted thereabout. The reinforcing annulus is formed of silicone and is disposed adjacent to the sealing annulus so as to urge the sealing annulus into sealing engagement with the enclosed shaft, particularly when the sealing annulus is cold or when the shaft is highly eccentric. The reinforcing annulus is responsive to an increase in temperature or to an absorption of liquid for increasing in size, thereby reducing the amount of compressive force exerted thereby against the deflected portion of the sealing annulus. In alternative embodiments of the invention, the reinforcing annulus can be molded to the inner case of the seal assembly, and a garter spring can be wrapped about the sealing element to increase the sealing force applied against the shaft.

It is an object of the present invention to provide an improved seal assembly for a rotatable shaft having a sealing element formed from a durable resilient sealing annulus urged into sealing engagement with the enclosed shaft by a silicone reinforcing annulus.

It is another object of the present invention to provide such an improved annular seal assembly which maintains a reliable seal when the sealing annulus is cold or when the shaft is highly eccentric when rotated.

It is a further object of the present invention to provide such an improved seal assembly which is simple and inexpensive in construction.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
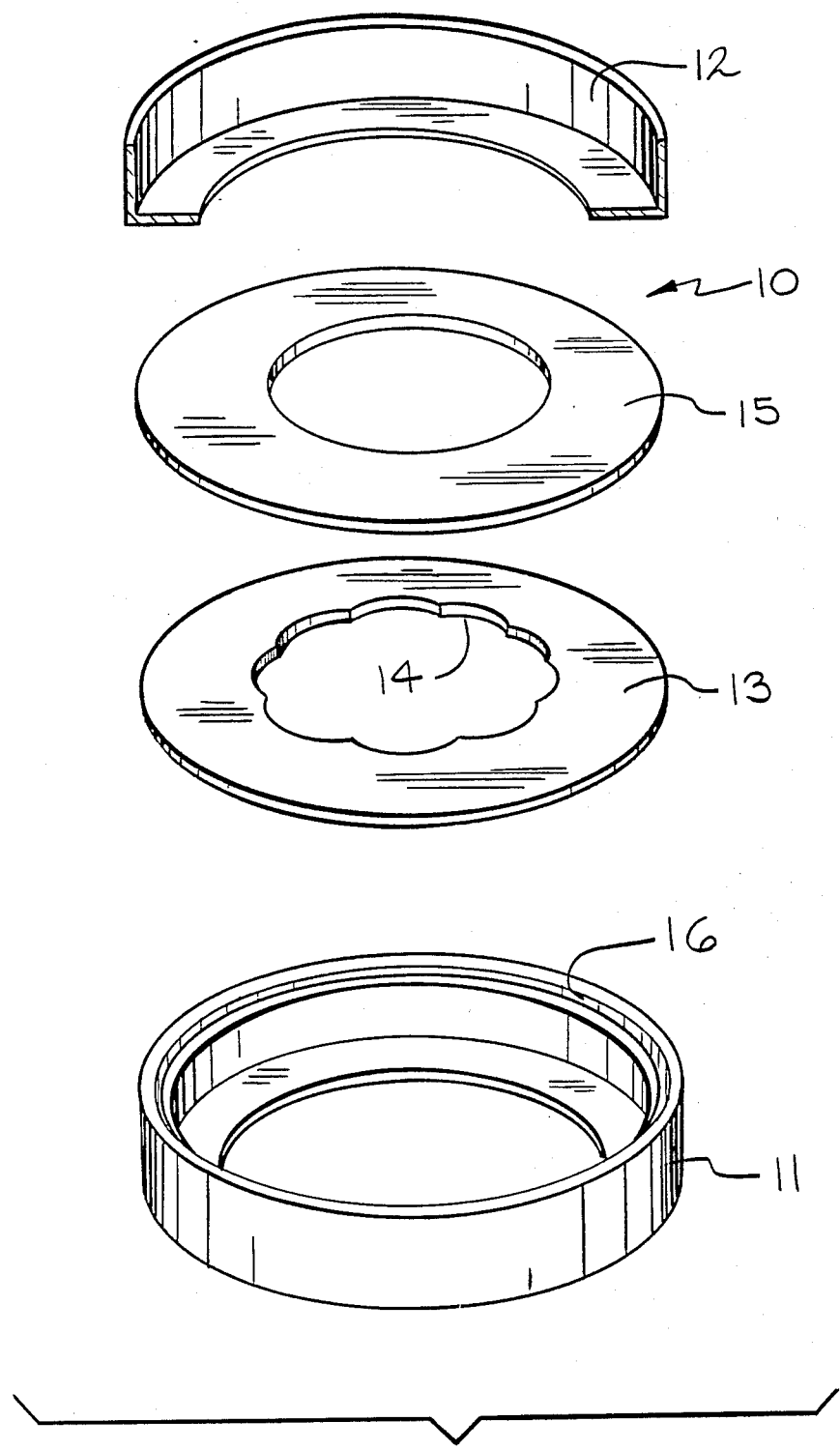
FIG. 1 is an exploded perspective view of a first embodiment of an improved seal assembly in accordance with the present invention.
Figure 2:
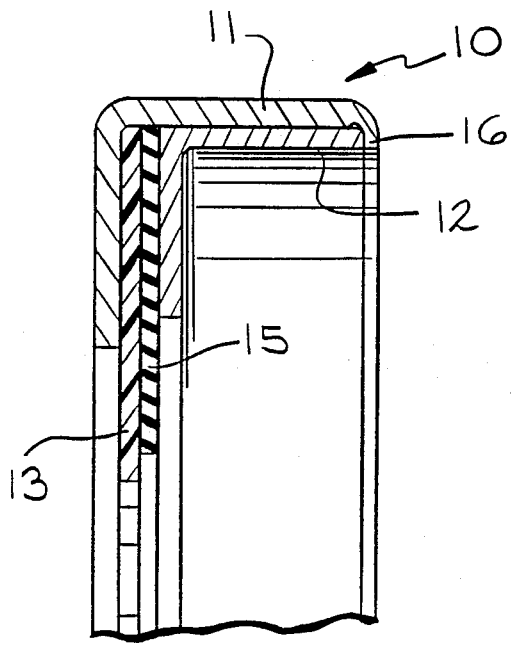
FIG. 2 is a sectional elevational view, partially broken away, of the assembled seal assembly of FIG. 1 shown in an unstressed condition.
Figure 3:
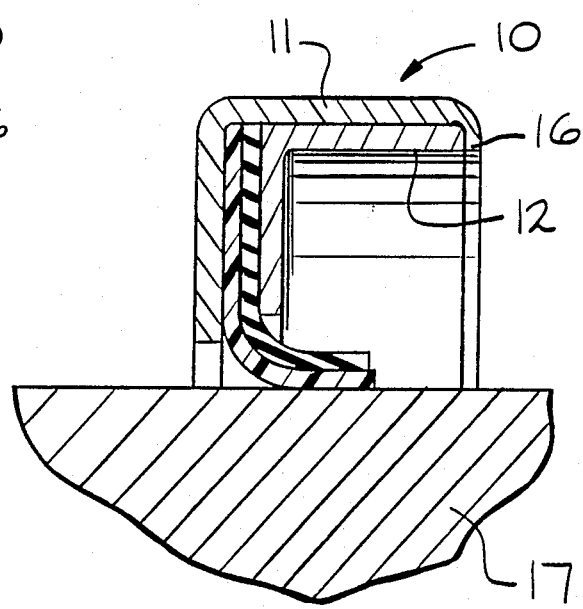
FIG. 3 is a sectional elevational view, partially broken away, of the seal assembly of FIG. 2 shown in a stressed condition about a shaft.

Referring now to the drawings, there is illustrated in FIGS. 1 through 3 a first embodiment of an improved seal assembly, indicated generally at 10, in accordance with the present invention. The seal assembly 10 includes an outer case 11 and an inner case 12, each of which is formed of a relatively rigid material such as metal. As best shown in FIGS. 2 and 3, the outer and inner cases 11 and 12 are both formed in the shape of an L-shaped annulus having axially and radially extending legs. When assembled, the axial legs of the outer and inner cases 11 and 12 are disposed adjacent to one another. The outer end of the axial leg of the outer case 11 may be provided with a curved circumferential lip 16 extending over the outer end of the axial leg of the inner case 12 to retain it therein.

Between the radial legs of the outer and inner cases 11 and 12, a flat (when unstressed, as shown in FIG. 2) annular sealing element is disposed. The sealing element is formed from a sealing annulus 13 and a reinforcing annulus 15. The outer radial portions of the sealing and reinforcing annuli 13 and 15 are sandwiched between and frictionally retained by the radial legs of the outer and inner cases 11 and 12. The sealing annulus 13 is disposed adjacent to the outer case 11, while the reinforcing annulus 15 is disposed adjacent to the inner case 12.

As shown in FIG. 3, the seal assembly 10 is adapted to be disposed about a shaft 17 to sealingly engage the outer peripheral surface thereof. Both the sealing annulus 13 and the reinforcing annulus 15 have central apertures formed therethrough defining inner diameters which are smaller than the outer diameter of the shaft 17. Thus, when the seal assembly 10 is inserted about the shaft 17, as shown in FIG. 3, the sealing and reinforcing annuli 13 and 15 are deflected from their flat unstressed condition. In this position, the deflected portion of the sealing annulus 13 engages the outer peripheral surface of the shaft 17, while the deflected portion of the reinforcement annulus 15 engages the outer surface of the deflected portion of the sealing annulus 13. In order function most efficiently, the annuli 13 and 15 are not adhered or otherwise secured together, except at those outer radial portions which are secured between the radial legs of the outer and inner cases 11 and 12. Typically, the seal assembly 10 is utilized to define an air-oil boundary about the shaft 17, with the outer case 11 and the sealing annulus 13 being exposed to the air side of the seal assembly 10 and the inner case 12 and the reinforcing annulus 15 being exposed to the oil side of the seal assembly 10.

To illustrate the relative sizes of the various components of the seal assembly 10 by means of an example, assume that the shaft 17 is formed having an outer diameter of 6.204 inches. The sealing annulus 13 may be formed having an inner diameter of 5.830 inches, while the reinforcing annulus 15 may be formed having an inner diameter of 6.000 inches. Consequently, the sealing annulus 13 and the reinforcing annulus 15 are deflected as shown in FIG. 3 when the seal assembly 10 is disposed about the shaft 17. When so disposed, the sealing annulus 13 exerts a compressive force about the outer surface of the shaft 17 to prevent the passage of air, oil, or other material from one side of the seal assembly 10 to the other. The reinforcing annulus 15 exerts an additional compressive force about the deflected portion of the sealing annulus 13. As will be explained in greater detail below, the reinforcing annulus 15 assists the sealing annulus 13 in sealing against the shaft 17 by exerting such additional compressive force.

If desired, the central aperture of the sealing annulus 13 can be formed having a scalloped inner surface 14 Such a structure is advantageous when the rotation of the shaft 17 is bi-directional, as explained in U.S. Pat. No. 4,283,064, owned by the assignee of the present invention. The disclosure of that patent is incorporated herein by reference. With respect to such scalloped inner surface, the term "inner diameter" refers to the largest diameter of the scalloped inner surface 14. The inner diameter of the reinforcing annulus 15 should be larger than this largest inner diameter defined by the scalloped inner surface so as not to interfere with the action thereof during use.

The sealing annulus 13 can be formed of a fluorocarbon resin material, such as Teflon. As mentioned above, such a material is resistant to wear, heat, pressure, and corrosion during use. Furthermore, it has been found that this material tends to return to its original shape as the temperature thereof increases. Thus, if the sealing annulus 13 is initially formed from a flat annulus of such material (as shown in FIG. 2) and is subsequently deflected during use (as shown in FIG. 3), it will tend to return to its original flat shape as the temperature thereof increases. As a result, a variable compressive force is exerted by the sealing annulus 13 against the outer peripheral surface of the shaft 17, depending upon the temperature of the Teflon material.

For example, when the seal assembly 10 is initially disposed about the shaft 17, the temperature thereof is relatively cold. Consequently, the sealing annulus 13 will initially exert a predetermined force radially inwardly against the outer surface of the shaft 17. However, as the temperature of the sealing annulus 13 increases (resulting from friction between the moving parts of the device as the operation thereof begins), the deflected portion of the sealing annulus 13 will further tend to return to its flat unstressed configuration. As a result, a greater force is exerted by the sealing annulus 13 radially inwardly against the outer surface of the shaft 17. The magnitude of the sealing force continues to increase until the temperature thereof reaches a steady state operating point.

The sealing annulus 13 may be sized such that the initial sealing force exerted thereby provides an adequate seal against the shaft 17. If sized in this manner, however, the sealing force exerted by the sealing annulus 13 will increase with the temperature thereof, causing unnecessary friction as described above. Alternatively, the sealing annulus 13 may be sized such that the sealing force exerted thereby when warm provides an adequate seal against the shaft 17. If sized in this manner, however, the initial sealing force exerted by the sealing annulus 13 not be sufficient during the initial start of operation, i.e., when the temperature of the sealing annulus 13 is relatively cold. Consequently, the reinforcing annulus 15 is provided to assist the sealing annulus 13 in exerting a sufficient compressive force against the outer peripheral surface of the shaft 17.

As mentioned above, the inner diameter of the reinforcing annulus 15 is also smaller than the outer diameter of the shaft 17. Thus, when the seal assembly 10 is installed about the shaft 17 as shown in FIG. 3, the reinforcing annulus 15 exerts a compressive force radially inwardly against the deflected portion of the sealing annulus 13, urging it into sealing engagement with the shaft 17. By appropriately sizing the reinforcing annulus 15, the additional force exerted by it against the sealing annulus 13 can be made sufficient to assist the inherent compressive force of the sealing annulus 13. The combined compressive forces of the sealing annulus 13 and the reinforcing annulus 15, therefore, provide a reliable seal against the enclosed shaft 17 even when the sealing annulus 13 is cold or when the shaft 17 is highly eccentric relative to the seal assembly 10 when rotated.

The reinforcing annulus 15 is formed from silicone. It has been found that this material expands or swells when the temperature thereof increases. For example, when the seal assembly 10 is initially disposed about the shaft 17, the temperature thereof is relatively cold. Consequently, the reinforcing annulus 15 will exert a predetermined force radially inwardly against the deflected portion of the sealing annulus 13. As the shaft 17 begins to rotate, the temperature of the reinforcing annulus 15 gradually increases, and the size of such annulus 15 gradually increases as well. As a result, the diameter of the central aperture formed through the reinforcing annulus 15 increases. Thus reinforcing annulus 15 exerts a gradually lesser amount of compressive force radially inwardly against the sealing annulus 13 during such temperature increase. When the temperatures of the sealing and reinforcing annuli 13 and 15 are relatively high, the reinforcing annulus 15 exerts less force upon the sealing annulus 13 than it does when such temperatures are relatively low.

The reduced amount of the force exerted by the reinforcing annulus 15 is not detrimental to the operation of the seal assembly 10, however, since the amount of compressive force exerted by the sealing annulus 13 gradually increases with the temperature at the same time, as discussed above. As mentioned above, the sealing element 13 needs less assistance to adequately seal against the shaft 17 under higher temperature conditions. Thus, the reduced compressive force exerted by the reinforcing annulus 15 is desirable because less friction is created between the sealing annulus 13 and the enclosed shaft 17.

It has also been found that the silicone material used to form the reinforcing annulus 15 expands somewhat when it is exposed to liquid. During rotation of the shaft 17, oil is splashed onto the reinforcing annulus 15. Consequently, the reinforcing annulus 15 gradually increases in size in a manner which is similar to the increase in size resulting from the increased temperature. As the size of the reinforcing annulus 15 increases, a lesser amount of force is applied by the reinforcing annulus 15 to the sealing annulus 13 and, consequently, against the shaft 17. However, as mentioned above, the loss of force provided by the reinforcing annulus 15 is made up by the additional force provided by the sealing annulus 13. Since the sealing annulus 13 performs satisfactorily when it is warm, the additional force provided by the reinforcing annulus 15 is not necessary.

Although the size of the reinforcing annulus 15 increases with the temperature thereof and with the absorption of oil, it continues to remain disposed about the deflected portion of the sealing annulus 13 during use. The reinforcement annulus 15 continues, therefore, to exert a certain amount of compressive force against the deflected portion of the sealing annulus 13 even when the both annuli 13 and 15 are warm. Such additional compressive force is desirable to a certain extent when the shaft 17 is highly eccentric when rotated relative to the seal assembly 10. In this situation, the reinforcing annulus 15 can be sized to exert a sufficient additional force directed radially inwardly against the sealing annulus 13 so as to prevent leakage even when such high eccentricity is encountered. Thus, the seal assembly 10 provides a reliable seal against the shaft 17 during all of these conditions of use.

Figure 4:
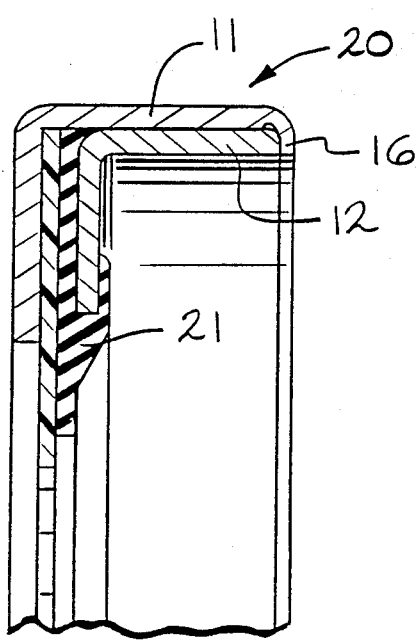
FIG. 4 is a sectional elevational view, partially broken away, of a second embodiment of an improved seal assembly in accordance with the present invention shown in an unstressed condition.
Figure 5:
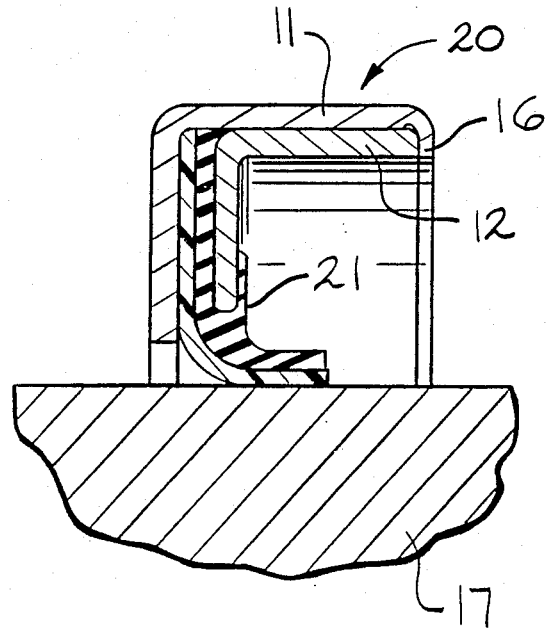
FIG. 5 is a sectional elevational view, partially broken away, of the seal assembly of FIG. 4 shown in a stressed condition about a shaft.

FIGS. 4 and 5 illustrate a second embodiment of an improved seal assembly, indicated generally at 20, in accordance with the present invention. Like reference numerals are utilized to designate elements of the seal assembly 20 which are identical to the corresponding elements described above in connection with FIGS. 1 through 3. The seal assembly 20 includes a modified reinforcing annulus 21. The reinforcing annulus 21 is molded to the inner portion of the radial surface of the inner case 12. Such integral formation of the reinforcing annulus 21 with the inner case 12 provides a more secure connection between the elements of the seal assembly 20, and also permits a somewhat greater force to be exerted by the reinforcing annulus 21 against the sealing annulus 13. The operation of the seal assembly 20 is otherwise basically the same as described above.

Figure 6:
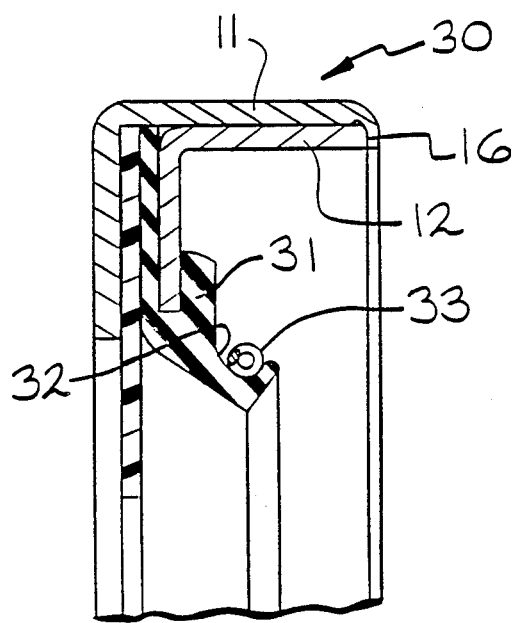
FIG. 6 is a sectional elevational view, partially broken away, of a third embodiment of an improved seal assembly in accordance with the present invention shown in an unstressed condition.
Figure 7:
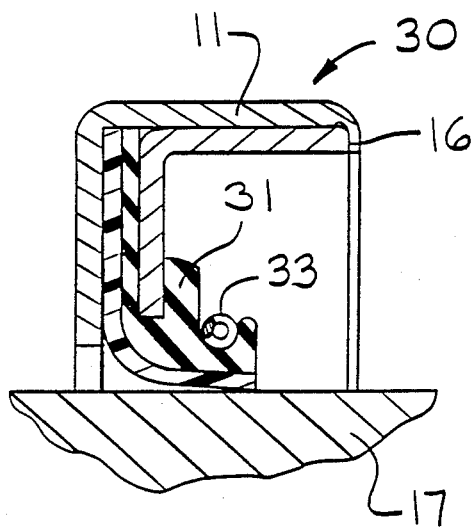
FIG. 7 is a sectional elevational view, partially broken away, of the seal assembly of FIG. 6 shown in a stressed condition about a shaft.

FIGS. 6 and 7 illustrate a third embodiment of an improved seal assembly, indicated generally at 30, in accordance with the present invention. Like reference numerals are utilized to designate elements of the seal assembly 30 which are identical to the corresponding elements described above in connection with FIGS. 1 through 3. The seal assembly 30 includes a modified reinforcing annulus 31 which is also molded to the inner case 12. A groove 32 is provided about the periphery of the portion of the reinforcing annulus 31 which is adapted to be disposed circumferentially about the shaft 17 when the seal assembly 30 is installed. A garter spring 33 is disposed within the groove 32. The garter spring 33 provides an additional force directed radially inwardly against the shaft 17 which has been found to be helpful in high eccentricity situations.

Figure 8:
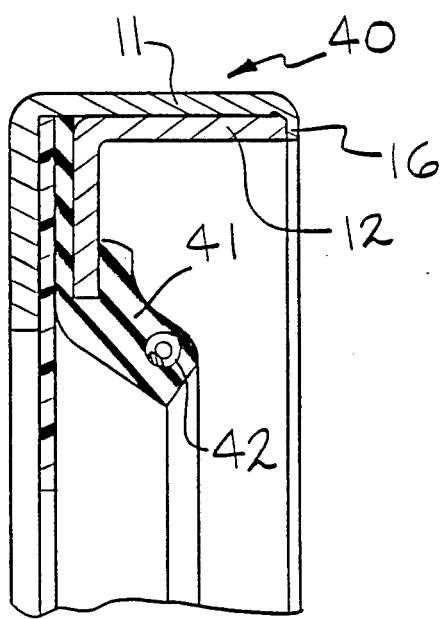
FIG. 8 is a sectional elevational view, partially broken away, of a fourth embodiment of an improved seal assembly in accordance with the present invention shown in an unstressed condition.
Figure 9:
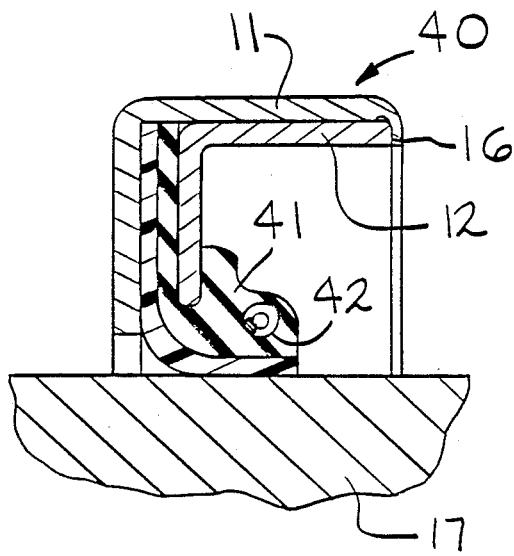
FIG. 9 is a sectional elevational view, partially broken away, of the seal assembly of FIG. 8 shown in a stressed condition about a shaft.

FIGS. 8 and 9 illustrate a fourth embodiment of an improved seal assembly, indicated generally at 40, in accordance with the present invention. Like reference numerals are utilized to designate elements of the seal assembly 40 which are identical to the corresponding elements described above in connection with FIGS. 1 through 3. The seal assembly 40 includes a modified reinforcing annulus 41 which is also molded to the inner case 12. A garter spring 42 is completely embedded within the reinforcing annulus 41 in the portion thereof adapted to circumferentially surround the shaft 17 when the seal assembly 40 is installed. The seal assembly 40 is preferable to the seal assembly 30, illustrated in FIGS. 6 and 7, because the garter spring 42 cannot be removed accidentally from the reinforcing element 41.

In accordance with the provisions of the patent statutes the principle and mode of operation of the present invention have been explained and illustrated in its preferred embodiments. However, it must be appreciated that the present invention can be practiced otherwise than as specifically explained and illustrated without departing from its spirit or scope.

What is claimed is:

1. A seal assembly adapted to be disposed about a shaft having an outer peripheral surface defining an outer diameter comprising:
    an annular case having an inner diameter which is larger than the outer diameter of the shaft;
    a sealing annulus secured to said case and having an inner diameter which is smaller than the outer diameter of the shaft such that a portion of said sealing annulus is deflected and exerts a compressive force radially inwardly against the outer peripheral surface of the shaft when disposed thereabout, said sealing annulus being formed of a material which is responsive to an increase in temperature therein so as to tend to return to its non-deflected annular shape, thereby increasing the amount of force applied radially inwardly against the shaft; and
    a reinforcing annulus disposed adjacent to said sealing annulus and secured to said case, said reinforcing annulus having an inner diameter which is smaller than the outer diameter of the shaft such that a portion of said reinforcing annulus is deflected and exerts a force radially inwardly against said deflected portion of said sealing annulus when disposed about the shaft, said reinforcing annulus being formed of a material which is responsive to an increase in temperature therein so as to increase the size thereof, thereby decreasing the amount of force applied radially inwardly against said sealing annulus.

2. The invention defined in claim 1 wherein said sealing element is formed of polytetrafluoroethylene.

3. The invention defined in claim 1 wherein said reinforcing element is formed of silicone.

4. The invention defined in claim 1 wherein said reinforcing element is molded to said inner case.

5. The invention defined in claim 1 wherein said case includes inner and outer case members, said case members being formed generally in the shape of an annulus having an L-shaped cross section and having an inner diameter which is larger than the outer diameter of the shaft.

6. A seal assembly adapted to be disposed about a shaft having an outer peripheral surface defining an outer diameter comprising:
    an annular case having an inner diameter which is larger than the outer diameter of the shaft;
    a sealing annulus secured to said case and having an inner diameter which is smaller than the outer diameter of the shaft such that a portion of said sealing annulus is deflected and exerts a compressive force radially inwardly against the outer peripheral surface of the shaft when disposed thereabout, said sealing annulus being formed of a material which is responsive to an increase in temperature therein so as to tend to return to its non-deflected annular shape, thereby increasing the amount of force applied radially inwardly against the shaft; and
    a reinforcing annulus disposed adjacent to said sealing annulus and secured to said case, said reinforcing annulus having an inner diameter which is smaller than the outer diameter of the shaft such that a portion of said reinforcing annulus is deflected and exerts a force radially inwardly against said deflected portion of said sealing annulus when disposed about the shaft, said reinforcing annulus being formed of a material which is responsive to an absorption of liquid of therein so as to increase the size thereof, thereby decreasing the amount of force applied radially inwardly against said sealing annulus.

7. The invention defined in claim 6 wherein said sealing element is formed of polytetrafluoroethylene.

8. The invention defined in claim 6 wherein said reinforcing element is formed of silicone.

9. The invention defined in claim 6 wherein said reinforcing element is molded to said inner case.

10. The invention defined in claim 6 wherein said case includes inner and outer case members, said case members being formed generally in the shape of an annulus having an L-shaped cross section and having an inner diameter which is larger than the outer diameter of the shaft.

* * * * *